United States Patent [19]

Hewitt

[11] Patent Number: 4,641,845
[45] Date of Patent: Feb. 10, 1987

[54] WHEELED PALLET

[76] Inventor: Timothy W. Hewitt, 18 Kensington, Pleasant Ridge, Mich. 48069

[21] Appl. No.: 694,604

[22] Filed: Jan. 24, 1985

[51] Int. Cl.[4] .............................................. B62B 3/04
[52] U.S. Cl. .............................................. 280/79.1 A
[58] Field of Search ................... 280/79.1 A, 79.1 R, 280/79.3, 2, 47.34, 33.99 T

[56] References Cited

U.S. PATENT DOCUMENTS

| | | | |
|---|---|---|---|
| 564,748 | 7/1896 | Dietz | 280/79.1 |
| 1,175,312 | 3/1916 | Simpson | 280/47.34 |
| 1,606,344 | 11/1926 | Burkhart | 280/79.1 A |
| 3,689,098 | 9/1972 | Rubin | 280/33.99 T |

FOREIGN PATENT DOCUMENTS 20994 of 1904 United Kingdom ............... 280/79.1

Primary Examiner—John J. Love
Assistant Examiner—Eric Culbreth
Attorney, Agent, or Firm—Gifford, Groh, VanOphem, Sheridan, Sprinkle and Dolgorukov

[57] ABSTRACT

A wheeled pallet for handling and transporting industrial loads such as storage or inventory bins. The device has a substantially rectangular base with a transversely mounted axle and rotatably mounted wheels. The end members of the base have raised intermediate portions with caster-type wheels for mobility. Tubular members vertically secured to the corners of the base accept the cylindrical legs of an industrial bin. Thus, the device provides mobility for industrial loads such as storage bins while preventing tipping because of its low construction.

7 Claims, 3 Drawing Figures

WHEELED PALLET

BACKGROUND OF THE INVENTION

I. Field of the Invention

This invention relates to industrial load handling carts and, in particular, to a wheeled pallet which provides mobility for industrial bins and loads while preventing tipping of the load.

II. Description of the Prior Art

In order to reduce manufacturing costs while improving production time, various devices have been developed which provide simple storage and ease of transportation of manufacturing parts and materials. The most basic of these devices, the wooden pallet, is widely utilized for storage of parts and materials. Because of their inexpensive construction, the pallet may be discarded once any parts which were stored on the pallet have been depleted. However, in order to transport the materials or parts stored on the pallet an industrial lift, such as a fork lift, must be utilized, thus increasing labor and production costs.

Although the standard pallet may be useful for large parts or materials which can be easily stacked, smaller parts or materials which cannot be readily stacked require some support. Industrial bins with wire or solid sides and a detachable gate were developed specifically for this purpose. Generally, industrial bins are provided with tubular corner members and cylindrical legs to facilitate stacking of the bins. Moreover, the bins are constructed such that they may be easily transferred with a fork lift. However, because of their size and weight, transfer without the aid of a mechanical lift is impossible.

In order to improve the mobility of industrial loads, various types of carts have been developed. However, the major shortcoming with any cart-type device in an industrial setting is their inherent instability, particularly when utilized with stacked or heavy loads. Thus, to avoid dangerous accidents while handling loads with a wheeled device, stacking of the load is prohibited thereby increasing transfer time. Moreover, because of the limited use of cart-type devices, it is necessary to transfer the load to the cart from its stored location, again requiring the aid of a mechanical lift. This is particularly true in an industrial setting where, in order to reduce storage requirements, industrial bins and parts are stacked as high as possible, in a separate area.

SUMMARY OF THE PRESENT INVENTION

The present invention is an improved industrial load transfer and storage device which overcomes all of the disadvantages of the previously known load handling devices.

The wheeled pallet according to the present invention has a generally rectangular base comprising a pair of parallel side members and a pair of end members. The end members each comprise a horizontal intermediate portion and two angled portions which connect the intermediate portions to the side members. The intermediate portions of the end members form a plane which is parallel to but above the plane formed by the side members. Caster-type wheels are secured to the intermediate portions of the end members to provide stability and directional mobility.

In addition to the caster wheels, a pair of fixed, ground-engaging wheels are mounted to the side members to provide stability. The wheels are preferably mounted to a transverse axle to increase the load handling capabilities of the device.

The device further comprises four tubular retaining members secured to the corners of the rectangular base. The retaining members are designed to accept the legs of an industrial storage bin. The retaining members may also be utilized to accept metal posts to form a retaining wall.

Thus, the wheeled pallet of the present invention can be utilized to store and transport industrial bins loaded with parts or manufacturing materials placed on the cart with minimal support. The construction of the device allows heavy loads to be easily manuevered and transported while preventing tipping of stacked bins by limiting the distance that any one corner of the pallet may vertically travel. Moreover, the placement of the wheels and the construction of the rectangular base allows transportation of the load by a fork lift, if necessary.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of the preferred embodiment of the present invention when read in conjunction with the accompanying drawing, in which like reference characters refer to like parts throughout the views, and in which.

DETAILED DESCRIPTION OF THE PREFERRED EMBODIMENTS

Figure 1:
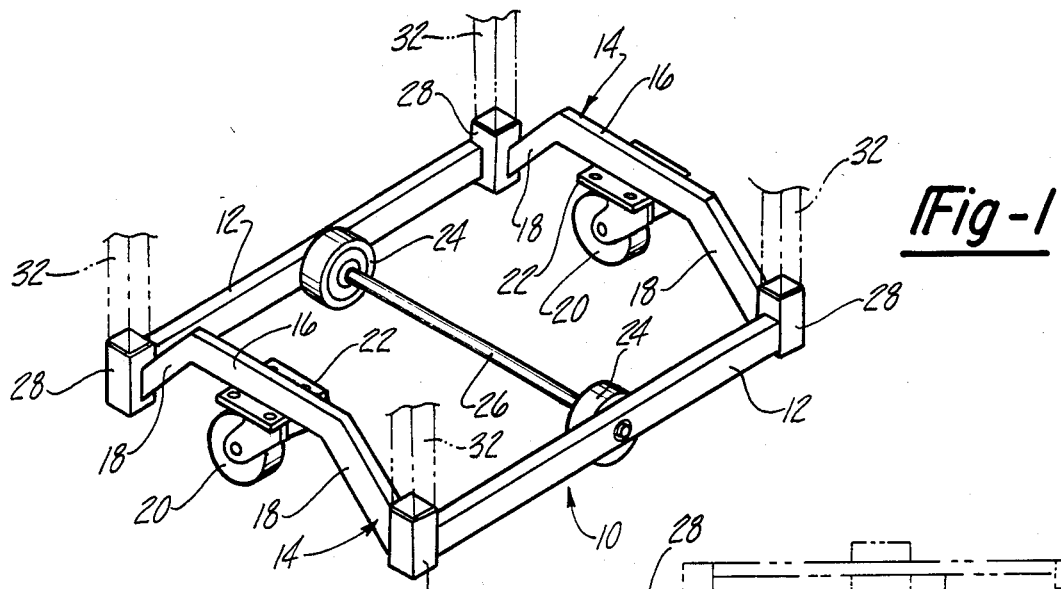
FIG. 1 is an elevated perspective of the preferred embodiment of the present invention.
Figure 2:
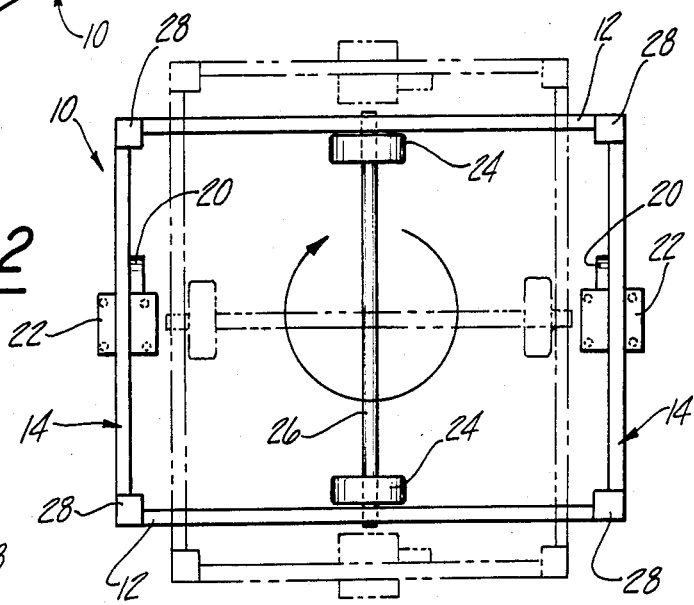
FIG. 2 is a top plan view of the present invention.
Figure 3:
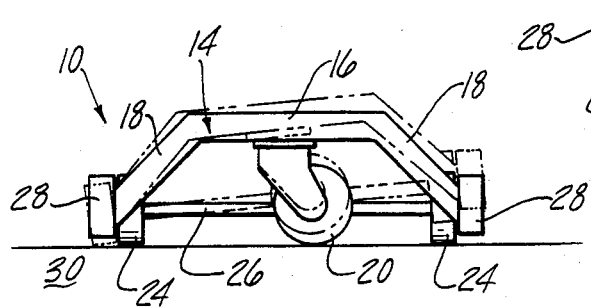
FIG. 3 is an end view of the present invention.

Referring generally to FIGS. 1 through 3, there is shown a load handling device 10 embodying the present invention and comprising side members 12 and end members 14. The side members 12 and the end members 14 form a substantially rectangular base. The device 10 is preferably of a tubular metal construction in order to provide sufficient load handling capacity.

As shown in FIGS. 1 and 3, the end members 14 comprise a horizontal intermediate portion 16 and angled end portions 18. The angled portions 18 connect the intermediate portions 16 to the side members 12. The intermediate portions 16 form a plane which is substantially parallel to and above the plane formed by the side members 12. The intermediate portions 16 provide added stability as will be subsequently described.

Secured to the intermediate portions 16 of the end members 14 are wheels 20. Preferably the wheels 20 are caster-type wheels which are rotatably secured to a plate 22. The plate 22 is then secured to the intermediate portions 16. The caster wheels 20 provide increased stability and directional mobility.

In addition to the caster wheels 20, a pair of wheels 24 are axially mounted to the side members 12. The wheels 24 are preferably connected to a transverse axle 26. Alteratively, the wheels 26 may independently secured to the side members 12. However, by providing a transverse axle 26 the load handling capacity and the stability of the device 10 are increased. Moreover, the wheels 24 and the transverse axle 26 are preferably mounted in the center of the side members 12. In the alternative, the axially mounted wheels 24 may be mounted toward either end of the device 10 thereby eliminating one of the caster wheels 20 and forming a three-wheeled pallet.

As is best shown in FIG. 1, four retaining members 28 are secured to the corners of the device 10. In the preferred embodiment of the device 10, the retaining members form the corners of the rectangular base. However, the retaining members 28 may be secured to the device 10 in any number of ways including mounting these members 28 to the corners formed by the side members 12 and the end members 14. The retaining members 28 are constructed of vertical tubular members designed to retain the legs of an industrial bin (not shown) or a plurality of retaining posts 32 as will be subsequently described.

Referring now to FIG. 3, the low construction of the device 10 increases the stability and load handling capabilities of the wheeled pallet, particularly with stacked or tall loads. The phantom lines of FIG. 3 show that in the event the load begins to tip, the retaining members 28 quickly engage the ground 30 preventing further movement. Moreover, in addition to manual transfer of heavy loads, the placement of the wheels and the overall construction of the device 10 permits transfer of loads by utilizing a fork-lift.

A large number of manufacturing parts or materials are stored in rectangular bins which are easily stacked. These bins are generally constructed with tubular corner members which are formed, at the bottom, into cylindrical legs. The load handling device 10 of the present invention is designed to retain these bins by accepting the legs within the retaining members 28. The intermediate portions 16 of the end members 14 also provide support along the underside of the industrial bin thereby increasing the stability of the load. Thus, by placing a bin such that the legs mate with the retaining members 28, the load is prevented from slipping off the pallet. Moreover, several of these bins may be stacked on top of the device 10 thereby facilitating transfer of large numbers of parts at reduced labor and equipment costs.

Alternatively, in order to transfer or store large or elongated materials, a plurality of retaining posts 32 may be placed within the retaining members 28, thus preventing the parts or materials from falling off of the device 10.

The foregoing detailed description has been given for clearness of understanding only and no unnecessary limitations should be understood therefrom as some modifications will be obvious to those skilled in the art.

I claim:

1. A load handling cart comprising:
    a parallel pair of end members each comprising a horizontal portion having a pair of first ends, and a pair of downwardly depending angled portions extending one each from said ends, the horizontal portion and each depending angled portion of said end member lying in a common substantially vertical plane;
    a parallel pair of elongated side members each having a pair of second ends and being perpendicularly attached at said second ends to said angled portions of said end members, so as to form a substantially rectangular shape having four corners at the junctures of said side and end members;
    at least one pair of first wheels coaxially secured one each to said side members, at a midpoint of said side members and between said side members;
    at least one second wheel secured to a midpoint of said horizontal portion of one of said end members; and
    a vertical tubular member affixed to each of said four corners joining said side members and said end members, dimensioned to receive therein a cargo support placed atop said cart;
    wherein said tubular members are positioned sufficiently close to the ground by said angled portions so as to come into contact with the ground prior to tippage of said cart, when said cart is subjected to a tipping force, thereby reducing the likelihood of spillage from said cart due to such force;
    whereby said tubular members simultaneously received said support therein, and reduce tippage of said cart.

2. The invention according to claim 1, wherein said side members comprise first upper surfaces defining a first plane, and said horizontal portions of said end members comprise second upper surfaces defining a second plane parallel to but spaced from said first plane a distance sufficient to allow the insertion of lifting means between said planes.

3. The invention according to claim 2, wherein said distance between said planes is sufficient to allow the insertion of the fork of a forklift therebetween.

4. The invention according to claim 1, wherein said side and end members together define an open rectangular space therebetween.

5. The invention according to claim 1, wherein said at least one second wheel comprises a pair of caster wheels affixed one each to said horizontal portions of said end members.

6. The invention according to claim 1, further comprising an axle mounted to and extending between said side members, wherein said at least one pair of first wheels is carried on said axle.

7. The invention according to claim 1, wherein said side members are somewhat longer than said end members.

* * * * *